United States Patent [19]

Johnson et al.

[11] Patent Number: 4,526,882

[45] Date of Patent: Jul. 2, 1985

[54] MIXED ESTER RETREATED PROPYLENE POLYMERIZATION CATALYST

[75] Inventors: Bryce V. Johnson, Elburn; Nicholas M. Karayannis; John S. Skryantz, both of Naperville, all of Ill.

[73] Assignee: Standard Oil Company (Indiana), Chicago, Ill.

[21] Appl. No.: 544,544

[22] Filed: Oct. 24, 1983

[51] Int. Cl.$^3$ ................................................ C08F 4/64
[52] U.S. Cl. .................................... 502/105; 502/121; 502/122; 502/123; 502/124; 502/125; 502/126; 502/127; 526/124; 526/125
[58] Field of Search ................ 502/105, 121, 122, 123, 502/124, 125, 126, 127

[56] References Cited

U.S. PATENT DOCUMENTS

| | | | |
|---|---|---|---|
| 4,431,570 | 2/1984 | Johnson | 502/151 |
| 4,431,571 | 2/1984 | Karayannis | 502/151 |
| 4,431,572 | 2/1984 | Karayannis et al. | 502/151 |

*Primary Examiner*—Patrick P. Garvin
*Attorney, Agent, or Firm*—Wallace L. Oliver; William T. McClain; William H. Magidson

[57] ABSTRACT

A comminuted, supported polymerization catalyst for alpha-olefins comprises (A) an organoaluminum compound and (B) a solid titanium-containing component formed by at least one halogen-containing compound of titanium(IV); (b) at least one electron donor; and (c) at least one hydrocarbon-insoluble magnesium-containing compound; and (2) retreating such comminuted product with (a) at least one halogen-containing compound of titanium(IV); and (b) a mixture containing ethylbenzoate and a substituted alkyl aromatic acid ester in which the substituent group has a negative Hammett constant; and optionally, at least one chlorocarbon and/or at least one haloalkylchlorosilane.

20 Claims, No Drawings

MIXED ESTER RETREATED PROPYLENE POLYMERIZATION CATALYST

BACKGROUND OF THE INVENTION

This invention relates to olefin polymerization catalysts and more particularly relates to an improved supported propylene polymerization catalyst.

Polymerization of alpha-olefins, such as ethylene, propylene and butene-1, to normally-solid, substantially crystalline polymers using catalyst compositions comprising transition metal and organoaluminum compounds is well known. Although many transition metal compounds have been disclosed as useful in such polymerizations, including salts of titanium, vanadium and zirconium, compounds of titanium predominate with tetravalent titanium (Ti(IV)) compounds typically proving most useful in ethylene polymerization and trivalent titanium (Ti(III)) compounds most useful in polymerization of propylene and higher alpha-olefins. Various forms of titanium components have been disclosed in both Ti(IV)- and Ti(III)-based compositions including a so-called "supported" titanium component. Supported titanium catalyst components have been disclosed in which titanium (either Ti(III) or Ti(IV)) is placed onto a metal oxide or metal halide support. One view of an advantage of supported titanium catalyst components is that in such components catalytically active titanium-containing sites are dispersed throughout the supported catalyst composition yielding more efficient use of the titanium content and resulting in higher overall catalytic activity, especially if based on titanium content.

Supported titanium catalyst components have been found most useful in ethylene polymerization such as described in U.S. Pat. No. 3,901,863. Until recently, however, supported titanium catalyst components have not been used substantially in commercial polymerization of propylene or higher alpha-olefins due to coproduction of high levels of noncrystalline or amorphous polymeric products. Production of such noncrystalline, amorphous products especially is detrimental in polymerization processes in which such noncrystalline products are not removed by solvent extraction.

Examples of nonsolvent processes are gas-phase and bulk processes. In gas-phase polymerization, solid polymer is formed directly on contact of gaseous monomer with a catalyst; while in a bulk process, polymer is formed in a liquid monomer medium. A combination of such processes is possible where polymerization occurs in two or more stages. In either process solid polymer advantageously is not treated further with a hydrocarbon solvent to remove noncrystalline material. Even in a slurry process in which noncrystalline material can be removed, production of such noncrystalline material usually is minimized because of its lower economic value.

Supported olefin polymerization catalysts have been disclosed in which crystallinity-promoting components are incorporated. Such components can be electron donor compounds which are associated with titanium-containing supported catalyst complexes. Further, preparations of supported olefin polymerization catalysts have been disclosed in which the supported catalyst material is comminuted, such as by ball-milling, in order to increase catalyst activity. An example of such catalyst material is described in U.S. Pat. No. 4,277,370 incorporated by reference herein. However, it has been found that while comminuting such a catalyst component can increase activity, presumably by exposing more active sites, such a comminuted catalyst also can yield increased noncrystalline polymer products as evidenced by increased solubles and extractables.

Olefin polymerization catalysts having higher activity and yielding fewer undesirable by-products are always desirable. Many supported titanium-containing catalyst components which have been comminuted, such as by ball-milling, have been found to be active; however, such a comminuted supported catalyst component which also yields low amounts of noncrystalline polymeric by-products would be very desirable. A method to produce such a catalyst would be very useful in the olefin polymerization catalyst art.

U.S. patent application Ser. Nos. 378,121, 378,404 and 378,406 all filed May 14, 1982 and now U.S. Pat. Nos. 4,431,570, 4,431,571 and 4,431,572, respectively, and European Published Application No. 95,290, all incorporated by reference herein, describe catalyst systems in which comminuted supported titanium-containing catalyst component is retreated with a mixture containing a titanium halide, at least one organic acid ester and, optionally, a chlorocarbon or a haloalkylchlorosilane. The invention described herein is an improvement over such catalysts in that the organic acid esters used in the retreatment step are specified as a mixture of particular esters with identifiable properties. The catalysts prepared according to this invention are shown to be superior to similar catalysts prepared without using the specific mixed esters described herein.

In another aspect of this invention, it has been found that catalysts prepared according to this invention are superior when tested at commercial slurry polymerization conditions. Many laboratory slurry polymerization tests are started by injecting catalyst into a relatively "cool" reaction medium. However, in a commercial slurry olefin polymerization reaction, catalyst is injected continuously into a "hot" reaction medium. It has been observed that catalysts of this invention prepared using a mixed ester retreatment show greater activity and better stereospecificity to similar catalysts prepared using a single ester retreatment. Thus, in "hot" start conditions the catalysts of this invention have been shown superior at commercial conditions.

SUMMARY OF THE INVENTION

A comminuted, supported polymerization catalyst for alpha-olefins comprises (A) an organoaluminum compound and (B) a solid titanium-containing component formed by (1) comminuting a solid reaction product comprising (a) at least one halogen-containing compound of titanium(IV); (b) at least one electron donor; and (c) at least one hydrocarbon-insoluble, magnesium-containing compound; and (2) retreating such comminuted product with (a) at least one halogen-containing compound of titanium(IV); (b) a mixture containing ethylbenzoate and at least one para-substituted alkyl aromatic acid ester in which the substituent group has a negative Hammett constant; and (c) optionally, a chlorocarbon and/or a haloalkylchlorosilane.

BRIEF DESCRIPTION OF THE INVENTION

It has been found that an improved comminuted supported titanium-containing catalyst component can be obtained by retreating such comminuted component with at least one halogen-containing compound with titanium(IV), and a mixture containing ethyl benzoate and at least one para-substituted alkyl aromatic acid ester in which the substituent group has a negative Hammett constant, and, optionally, at least one chlorocarbon or at least one haloalkylchlorosilane.

Olefin polymerization catalysts, especially propylene polymerization catalysts, supported on a magnesium-containing compound and containing an electron donor compound such as an alkyl aromatic acid ester have been described widely. Ethyl benzoate seems to be the preferable alkyl aromatic acid ester in most systems. Complete explanation for the observed effect of ethyl benzoate remains unclear, although it is believed that a "built-in" catalyst modifier plays several roles in the complex interactions of catalyst, support, monomer and polymer. Although it has been found that some compounds are superior to ethyl benzoate in the role of catalyst/cocatalyst modifier, these other compounds are inferior to ethyl benzoate in other roles so that ethyl benzoate usually is the built-in modifier of choice. In an attempt to change the characteristics of an alkyl aromatic ester, substituent groups can be place on the aromatic ring to alter the basicity of the ester. Electron withdrawing groups having positive Hammett constants, such as —Cl and —Br, para substituted onto an alkyl aromatic acid ester produce weaker bases while aromatic para substituents having negative Hammett constants produce stronger bases. It has been found that alkyl aromatic esters other than ethyl benzoate introduced partially or exclusively in the formation of the supported titanium-containing catalyst component described herein do not produce better catalysts than use of ethyl benzoate alone. However, it has been discovered that inclusion of a stronger base such as a para-substituted alkyl aromatic acid ester containing an electron donating substituent in the retreatment step in preparation of the supported catalyst of this invention substantially improves catalyst performance over the use of ethyl benzoate alone.

The supported titanium-containing olefin polymerization catalyst component is formed by (I) reacting a titanium(IV) halide, an electron donor compound and a hydrocarbon-insoluble magnesium-containing compound; (II) comminuting the resulting solid product; and (III) retreating the comminuted product with a mixture of ethyl benzoate and a para-substituted alkyl aromatic acid ester in which the substituent group has a negative Hammett constant.

Since the retreatment step has been found critical to this invention, it will be described briefly first. As noted above, retreatment of a comminuted titanium-containing supported olefin polymerization catalyst has been found beneficial. In such retreatment, comminuted solid component is reacted with a mixture containing a titanium(IV) halide and at least one organic acid ester. In addition, chlorocarbons and/or haloalkylchlorosilanes may be present. Although it had been assumed that a mixture of organic acid esters could be used, there was no expectation that any particular mixture would be preferable to the usual esters such as ethyl benzoate, ethyl anisate and methyl-p-toluate alone. The invention described herein is the discovery that among the numerous organic acid esters and conceivable combinations thereof, surprisingly a specific class of combination of alkyl aromatic acid ester produces superior results over the previously-preferable ester, ethyl benzoate.

The class of retreatment organic acid esters is a mixture containing ethyl benzoate and a para-substituted alkyl aromatic acid ester in which the aromatic substituent group has a negative Hammett constant. The para-substituted alkyl aromatic esters useful in this invention can be described by the following formula:

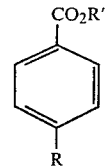

wherein R' is an alkyl or substituted alkyl group having 1 to about 12, preferably 1 to about 6, carbon atoms and R is a group having a negative Hammett constant.

The aromatic substituent groups useful in this invention are those recognized as being electron donating to an aromatic ring and compatible with an olefin polymerization system. Electron donating substituent groups are identified as having a negative Hammett para-substituent constant, sigma ($\sigma$), as described in Chapter 4 of J. Hine, "Physical Organic Chemistry," 2d Ed., McGraw-Hill (1962), incorporated by reference herein. Suitable electron donating groups include alkyls such as methyl, ethyl, propyl, isopropyl, butyl, s-butyl, isobutyl, t-butyl, pentyl, hexyl and the like; alkoxy groups such as methoxy, ethoxy, t-butoxy, phenoxy and the like; dialkylamino such as dimethyl amino, dipropyl amino, methyl propyl amino and the like; alkyl-substituted silyls such as $Si(CH_3)_3$; silyl-substituted alkyls such as $CH_2Si(CH_3)_3$; and hydroxy. Suitable substituted groups can have from one to about 12, typically 1 to about 6, carbon atoms as well as other atoms such as oxygen, nitrogen, silicon, sulfur and phosphorus.

Typical alkyl aromatic esters para-substituted with electron-donating groups include methyl anisate, ethyl anisate, propyl anisate, isopropyl anisate, methyl toluate, ethyl toluate, ethyldimethylamino benzoate, methyl-t-butyl benzoate, methylhydroxy benzoate, ethylhydroxy benzoate and the like. Ethyl anisate and methyl-t-butyl benzoate have been found especially preferable.

Suitable mixtures of ethyl benzoate and para-substituted alkyl aromatic acid ester useful in the retreatment step of this invention contain about 30 to 70 mole percent ethyl benzoate and about 70 to 30 mole percent para-substituted alkyl aromatic ester. Typically, the molar ratios of ethyl benzoate to substituted ester range from about 70/30 to about 50/50 and preferably are about 60/40.

The hydrocarbon-insoluble, magnesium-containing compound can be a magnesium halide; a reaction product of a magnesium halide, such as $MgCl_2$ and $MgBr_2$, with an organic compound, such as an alcohol or an organic acid ester or with an organometallic compound of metals of Groups I–III. Preferably, however, the hydrocarbon-insoluble, magnesium-containing compound is based on at least one magnesium alcoholate which preferably has been pretreated with at least one modifier such as mineral acid and anhydrides of sulfur, organometallic chalcogenide derivative of hydrogen sulfide, and organic acids and esters thereof. Most preferably, such magnesium-containing compound is the pretreatment product of at least one magnesium alcoholate, at least one Group II or IIIA metal alkyl and at least one modifier selected from the group consisting of mineral acids and anhydrides of sulfur, organometallic chalcogenide derivatives of hydrogen sulfide, organic acids and organic acid esters.

Titanium(IV) compounds useful in preparation of the stereospecific supported catalyst components of this invention are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly titanium tetrachloride ($TiCl_4$) are most preferred from the standpoint of attaining maximum activity and stereospecificity.

Organic electron donors useful in preparation of the stereospecific supported catalyst components of this invention are organic compounds containing one or more atoms of oxygen, nitrogen, sulfur, and phosphorus. Such compounds include organic acids, organic acid esters, alcohols, ethers, aldehydes, ketones, amines, amine oxides, amides, thiols, various phosphorus acid esters and amides, and the like. Mixtures of organic electron donors can be used if desired.

Specific examples of useful oxygen-containing electron donor compounds include organic acids and esters. These compounds also can be used in pretreating the magnesium-containing component as described below. Organic acids useful according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and aryloxy-substituted aliphatic acids of 1 to about 20 carbon atoms; aromatic acids of 7 to about 14 carbon atoms; and halogen-, hydroxyl-, alkyl-, alkoxy-, aryl-, and aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acids, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids including those named above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of acids including those named above.

Preferred organic acids and esters are benzoic acids, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Specific examples of other useful oxygen-containing electron donors include aliphatic alcohols such as methanols, ethanols, propanols, butanols, pentanols, hexanols, and so forth; aliphatic diols and triols such as ethylene glycol, propanediols, glycerol, butanediols, butanetriols, pentanediols, pentanetriols, hexanediols, hexanetriols, and so forth; aromatic alcohols such as phenol, di-, tri-, and tetra-hydroxybenzenes, naphthols, and dihydroxynaphthalenes, aralkyl alcohols such as benzyl alcohol, phenylethanols, phenylpropanols, phenylbutanols, phenylpentanols, phenylhexanols, and the like; alkaryl alcohols such as cresols, xylenols, ethylphenols, propylphenols, butylphenols, pentylphenols, hexylphenols, and the like; dialkyl ethers such as dimethyl, diethyl, methylethyl, dipropyl, dibutyl, dipentyl, dihexyl ethers, and so forth; alkylvinyl and alkylallyl ethers such as methyl-, ethyl-, propyl-, butyl-, pentyl-, and hexylvinyl, and hexylallyl ethers; alkaryl ethers such as anisole, phenetole, propylphenyl ether, butylphenyl ether, pentylphenyl ether, hexylphenyl ether and the like; arylvinyl and arylallyl ethers such as phenylvinyl ether and phenylallyl ether; diaryl ethers such as diphenyl ether; and cyclic ethers such as dioxane and trioxane.

Specific examples of other suitable oxygen-containing organic electron donors include aldehydes such as formaldehyde, acetaldehyde, propioaldehyde, butyroaldehyde, valeraldehyde, caproaldehyde, and the like; xylaldehyde, tolualdehyde, and alpha-tolualdehyde; and ketones such as acetone, diethyl ketone, methyl ethyl ketone, dipropyl ketone, dibutyl ketone, dipentyl ketone, dihexyl ketone, and the like; cyclobutanone, cyclopentanone, and cyclohexanone, and the like; acetophenone, propiophenone, butyrophenone, valerophenone, caprophenone, and the like; and diphenyl ketone.

Specific examples of useful nitrogen-containing organic electron donors include tertiary amines wherein at least one of the groups bonded to nitrogen contains at least two carbon atoms such as dimethylethylamine, methyldiethylamine, N,N'-tetramethylethylenediamine, triethylamine, tri-n-butylamine, dimethyl-n-hexylamine, tetraethylputrescine, diphenylmethylamine, triphenylamine, tritolylamine, diphenylbenzylamine, triphenylethylamine, triethylphenylamine, bis(diethylamino)benzenes, and the like; saturated heterocyclic amines and derivatives thereof such as pyrrolidine, piperidine, 2- methyl-pyrrolidine, 2-methylpiperidine, 2,5-dimethylpyrrolidine, 2,6-dimethylpiperidine, 2,4,6-trimethylpiperidine, 2,2,6,6-tetramethylpiperidine, and the like; unsaturated heterocyclic amines and derivatives thereof such as pyridine and pyrimidine, picolines, lutidines, collidines, ethylpyridines, diethylpyridines, triethylpyridines, benzylpyridines, methylpyrimidines, ethylpyrimidines, benzylpyrimidines, and the like.

Examples of useful sulfur-containing organic electron donors include thiols such as methanethiols, ethanethiols, ethanedithiols, propanethiols, butanethiols, butanedithiols, hexanethiols, and the like; thioethers such as ethylthioethane, ethylthio-n-butane, and the like; and other thio analogues of the above-described oxygen-containing organic electron donors.

Specific examples of useful phosphorus-containing organic electron donors include phosphorus analogues of the above-described nitrogen-containing organic electron donors such as triethylphosphine, ethyldibutylphosphine, triphenylphosphine, and the like.

Examples of useful organic electron donors containing two or more atoms of oxygen, nitrogen, sulfur, and phosphorus include amides such as acetamide, butyramide, caproamide, benzamide, and the like; aminoalcohols such as ethanolamine, hydroxyanilines, aminocresols, and the like; amine oxides such as lutidine-N-oxides and collidine-N-oxides; aminoethers such as bis(2-ethoxyethyl)amine; thioacids such as thioacetic acid, thiobutyric acid, thiovaleric acid, thiobenzoic acid, and the like; organosulfonic acids such as methanesulfonic acid, ethanesulfonic acid, phenylsulfonic acid, and the like various phosphorus acid derivatives such as trimethyl phosphite, tri-n-propyl phosphite, triphenyl phosphite, triethyl trithiophosphite, hexamethylphosphoric triamide, and the like; and phosphine oxides such as triethylphosphine oxide, triphenylphosphine oxide, and the like.

From the standpoint of catalyst performance and preparative ease, the organic electron donors which are preferred according to this invention are $C_1-C_6$ alkyl esters of aromatic monocarboxylic acids and halogen-, hydroxy-, oxo-, alkyl-, alkoxy-, aryl-, and aryloxy-substituted aromatic monocarboxylic acids. Among these, the alkyl esters of benzoic and halobenzoic acids wherein the alkyl group contains 1 to about 6 carbon atoms, such as methyl benzoate, methyl bromobenzoate, ethyl benzoate, ethyl chlorobenzoate, ethyl bromobenzoate, butyl benzoate, isobutyl benzoate, hexyl benzoate, and cyclohexyl benzoate, are particularly preferred. Best results are attained through the use of ethyl benzoate. Other suitable esters include ethyl anisate and methyl-p-toluate.

In preparation of the stereospecific supported catalyst components of this invention, the magnesium-containing product, titanium(IV) component, and organic electron donor component are contacted in amounts such that the atomic ratio of titanium to metal in the magnesium-containing component employed in pretreatment is at least about 0.5:1. Preferably, this ratio ranges from about 0.5:1 to about 20:1. Greater amounts of titanium can be employed without adversely affecting catalyst component performance, but there typically is no need to exceed a titanium to magnesium ratio of about 20:1, as only a portion of the titanium is affixed to the pretreatment product during the preparative reaction. More preferably, the titanium to magnesium ratio ranges from about 2:1 to about 15:1 to ensure that the catalyst components contain sufficient titanium to exhibit good activities without being wasteful of the titanium compound employed in preparation. The electron donor component is employed in an amount ranging from about 0.001 to about 1.0 mole per gram atom of titanium, and preferably from about 0.005 to about 0.6 mole per gram atom. Best results are achieved when this ratio ranges from about 0.01 to about 0.3 mole per gram atom of titanium.

The sequence in which the components are contacted may be varied. Suitably, magnesium-containing product, titanium(IV) component, and electron donor component are contacted concurrently or two of the components are contacted followed by addition of the remaining component. From the standpoint of catalyst performance and preparative ease, the preferred preparative sequence is to bind the magnesium-containing product and titanium(IV) component and then add the organic electron donor component to the result.

According to the invention, the magnesium-containing product, titanium(IV), and electron donor components preferably are contacted in the presence of an inert hydrocarbon or halogenated hydrocarbon diluent, although other suitable techniques can be employed. Suitable diluents are materials which are substantially inert to the components employed and are liquid at the temperatures employed or can be maintained in the liquid state through the use of elevated pressure. As in the case of the diluents employed in pretreatment of magnesium alcoholates, it is desirable to purify any diluent to be employed to remove water, oxygen, carbon oxides, and other extraneous catalyst poisons. Examples of suitable diluents include those named above as suitable pretreatment diluents; nonane, 1,1,2-trichloroethane and carbon tetrachloride are preferred.

Reaction between the magnesium-containing product, titanium component, and organic electron donor is carried out at temperatures ranging from about 50° to about 170° C. Best results are obtained at about 90° to about 130° C. Generally the reaction is carried out over a period of several minutes to several hours, with about ½ to about 10 hours giving good results at economical rates. Most preferably, the reaction time ranges from about 1 to about 5 hours. When the components employed in preparation of the invented catalyst components are contacted according to the preferred preparative sequence, best results are attained when the magnesium-containing product and titanium(IV) component are combined at about ambient temperature followed by addition of electron donor, at about ambient temperature and with agitation, over about ¼ to about 1½ hours and then heating at about 130° to about 160° C. for about ½ to about 3 hours with continued agitation.

In addition, the reaction mixture of the magnesium-containing product, titanium component and electron donor can contain an organochlorosilane in a concentration up to about 80 mole % based upon titanium.

The magnesium-containing product used in this invention preferably is obtained by contacting pretreatment components comprising (a) at least one magnesium alcoholate of the formula $Mg(OR^1)_n(OR^2)_{2-n}$ wherein $R^1$ and $R^2$ are identical or different hydrocarbyl radicals of 1 to about 20 carbon atoms and n ranges from 0 to 2; and (b) at least one Group II or IIIA metal alkyl containing 1 to about 20 carbon atoms per alkyl radical.

The pretreatment components also may comprise (c) at least one modifier selected from the group consisting of mineral acids and anhydrides of sulfur, organometallic chalcogenide derivatives of hydrogen sulfide, organic acids and esters thereof.

Specific examples of magnesium alcoholates which are useful in forming a pretreated magnesium-containing component according to this invention include $Mg(OCH_3)_2$, $Mg(OC_2H_5)_2$, $Mg(OC_4H_9)_2$, $Mg(OC_6H_5)_2$, $Mg(OC_6H_{13})_2$, $Mg(OC_9H_{19})_2$, $Mg(OC_{10}H_7)_2$, $Mg(OC_{12}H_9)_2$, $Mg(OC_{12}H_{25})_2$, $Mg(OC_{16}H_{33})_2$, $Mg(OC_{20}H_{41})_2$, $Mg(OCH_3)(OC_2H_5)$, $Mg(OCH_3)(OC_6H_{13})$, $Mg(OC_2H_5)(OC_8H_{17})$, $Mg(OC_6H_{13})(OC_{20}H_{41})$, $Mg(OC_3H_7)(OC_{10}H_7)$, and $Mg(OC_{16}H_{33})(OC_{18}H_{37})$. Mixtures of magnesium alcoholates also can be employed if desired. Additionally, although not preferred, mixtures of magnesium alcoholates with minor amounts of other suitable metal salts such as alcoholates of lanthanum and the lanthanide metals, magnesium halides, hydroxyhalides, carboxylates, and so forth can be used.

From the standpoint of cost and availability, magnesium alcoholates which are preferred for use according to this invention are those of the formula $Mg(OR^1)_2$ wherein $R^1$ is as defined above. In terms of catalytic activity and stereospecificity, best results are achieved through the use of magnesium alcoholates of the formula $Mg(OR^1)_2$ wherein $R^1$ is an alkyl radical of 1 to about 6 carbon atoms, an aryl radical of 6 to about 12 carbon atoms or an alkaryl or aralkyl radical of 6 to about 12 carbon atoms. Best results are attained through the use of magnesium ethoxide.

Useful Group II and IIIA metal alkyls are compounds of the formula $MR^3{}_m$ wherein M is a Group II or IIIA metal, each $R^3$ is independently an alkyl radical of 1 to about 20 carbon atoms, and m corresponds to the valence of M. Examples of useful metals, M, include magnesium, calcium, zinc, cadmium, aluminum, and gallium. Examples of suitable alkyl radicals, $R^3$, include methyl, ethyl, butyl, hexyl, decyl, tetradecyl, and eicosyl.

From the standpoint of catalyst component performance, preferred Group II and IIIA metal alkyls are those of magnesium, zinc, and aluminum wherein the alkyl radicals contain 1 to about 12 carbon atoms. Specific examples of such compounds include $Mg(CH_3)_2$, $Mg(C_2H_5)_2$, $Mg(C_2H_5)(C_4H_9)$, $Mg(C_4H_9)_2$, $Mg(C_6H_{13})_2$, $Mg(C_{12}H_{25})_2$, $Zn(CH_3)_2$, $Zn(C_2H_5)_2$, $Zn(C_4H_9)_2$, $Zn(C_4H_9)(C_8H_{17})$, $Zn(C_6H_{13})_2$, $Zn(C_{12}H_{25})_2$, $Al(CH_3)_3$, $Al(C_2H_5)_3$, $Al(C_3H_7)_3$, $Al(C_4H_9)_3$, $Al(C_6H_{13})_3$, and $Al(C_{12}H_{25})_3$. More preferably a magnesium, zinc, or aluminum alkyl containing 1 to about 6 carbon atoms per alkyl radical is used. Best results are achieved through the use of trialkylaluminums containing 1 to about 6 carbon atoms per alkyl radical, and particularly triethylaluminum.

Modifiers useful in pretreatment of a magnesium-containing component are mineral acids and anhydrides of sulfur, organometallic chalcogenide derivatives of hydrogen sulfide, organic acids, organic acid esters, and mixtures thereof.

Specific examples of useful mineral acids and anhydrides of sulfur include sulfur dioxide, sulfur trioxide, sulfuric acid, fuming sulfuric acid, and halosulfonic acids such as chlorosulfonic and fluorosulfonic acids. Hydrogen sulfide, which behaves as a weak acid in aqueous solution, also in considered a mineral acid of sulfur for purposes hereof. Also contemplated are the organometallic chalcogenide derivatives of hydrogen sulfide in which each hydrogen is replaced by an organosilicon, organogermanium, or organotin group wherein the organic radicals are selected from the group consisting of phenyl, alkyl-substituted phenyl, phenyl-substituted alkyl, and alkyl radicals, such alkyl radicals containing 1 to about 6 carbon atoms. Specific examples of useful organometallic chalcogenide pretreatment modifiers include bis(triphenyltin)sulfide, bis(tritolyltin)sulfide, bis(triethylphenyltin)sulfide, bis(trihexylphenyltin)sulfide, bis(triphenylmethyltin)sulfide, bis(triphenylethyltin)sulfide, bis(triphenylhexyltin)sulfide, bis(trimethyltin)sulfide, bis(triethyltin)sulfide, bis(tributyltin)sulfide, bis(trihexyltin)sulfide, and similar silicon- and germanium-containing compounds.

Among the mineral acids and anhydrides of sulfuric and organometallic chalcogenide derivatives, sulfuric acid, fuming sulfuric acid, chlorosulfonic acid, and hydrogen sulfide are preferred because they lead to the best overall improvements in activities and stereospecificities.

Organic acids useful in pretreatment of a magnesium-containing component according to this invention are acids containing from 1 to about 20 carbon atoms and 1 to about 4 carboxyl groups. Such acids include aliphatic acids of 1 to about 20 carbon atoms; halogen-, hydroxyl-, oxo-, alkyl-, alkoxy-, aryl-, and aryloxy-substituted aliphatic acids of 1 to about 20 carbon atoms; aromatic acids of 7 to about 14 carbon atoms; and halogen-, hydroxyl-, alkyl-, alkoxy-, aryl-, and aryloxy-substituted aromatic acids of 7 to about 20 carbon atoms. Monocarboxylic acids are preferred over the polycarboxylic acids.

Specific examples of useful aliphatic acids include saturated acids such as formic acid, acetic acid, oxalic acid, malonic acid, butyric acid, pivalic acid, valeric acid, glutaric acid, caproic acid, cyclohexanecarboxylic acid, suberic acid, lauric acid, stearic acid, and arachidic acid; and unsaturated acids such as acrylic acid, crotonic acid, isocrotonic acid, vinylacetic acid, allylacetic acid, maleic acid, hydrosorbic acid, sorbic acid, undecenoic acid, oleic acid, and stearolic acid.

Specific examples of useful substituted aliphatic acids include chloroacetic acid, phenylacetic acid, chloromalonic acid, benzylmandellic acid, bromobutyric acid, ketobutyric acid, 2-hydroxyhexanoic acid, linoleic acid tetrabromide, 3-chloro-2-butenoic acid, benzallactic acid, mucochloric acid, mucobromic acid, piperic acid, and ketocaproic acid.

Specific examples of useful aromatic acids and substituted aromatic acids include benzoic acid, phthalic acid, trimellitic acid, pyromellitic acid, naphthoic acids, chlorobenzoic acids, chloronaphthoic acids, hydroxynaphthoic acids, toluic acids, xylilic acids, isodurylic acids, butylbenzoic acids, dihexylbenzoic acids, anisic acid, veratric acid, asaronic acid, ethoxybenzoic acids, piperonylic acids, vanillic acid, cresotic acid, and everninic acid.

Organic acid esters useful as pretreatment components according to this invention include alkyl and haloalkyl esters of acids, including those named, above wherein the alkyl group or groups contain 1 to about 12 carbon atoms, and aryl and haloaryl esters of such acids wherein the aryl group or groups contain 6 to about 10 carbon atoms. Specific examples of useful organic acid esters include the methyl, chloromethyl, ethyl, chloroethyl, bromoethyl, butyl, hexyl, cyclohexyl, octyl, chlorododecyl, phenyl, chlorophenyl, and naphthyl esters of acids, including those named above.

Preferred organic acids and esters are benzoic acid, halobenzoic acids and the alkyl esters thereof wherein the alkyl group contains 1 to about 6 carbon atoms such as methyl benzoate, methyl bromobenzoates, ethyl benzoate, ethyl chlorobenzoates, butyl benzoate, isobutyl benzoate, hexyl benzoate, and cyclohexyl benzoate, as these give good results in terms of activity and stereospecificity and are convenient to use.

Mixtures of pretreatment modifiers which are preferred according to this invention are combinations of at least one of the above-described mineral acids or anhydrides of sulfur or organometallic chalcogenide derivatives with at least one of the above-described organic acids or organic acid esters. More preferred combinations are those containing at least one of the preferred sulfur-containing modifiers identified above (i.e., sulfuric acid, fuming sulfuric acid, chlorosulfonic acid, and hydrogen sulfide) and at least one of the preferred organic acids and esters identified above (i.e., benzoic acid, halobenzoic acids, and the $C_1$ to about $C_6$ alkyl esters thereof). Best results are obtained through the use of a combination of chlorosulfonic acid and methyl benzoate.

The pretreated magnesium-containing component is obtained by contacting components comprising at least one magnesium alcoholate and at least one Group II or IIIA metal alkyl. Preferably, at least one of the above-described pretreatment modifiers also is employed in preparation of the pretreatment product. The components are employed in amounts such that the atomic ratio of metal in the Group II or IIIA metal alkyl component to metal in the magnesium alcoholate component ranges from about 0.001:1 to about 1:1. Preferably, this ratio ranges from about 0.005:1 to about 0.5:1 as these amounts provide for good improvements in catalyst performance without hindering removal of unreacted Group II or IIIA metal alkyl from the reaction product which ultimately forms. In the preferred embodiment of this invention, wherein at least one pretreatment modifier is employed in preparation of the pretreated magnesium-containing product, the modifier is employed in an amount which is effective to improve catalyst component performance but not so great as to hinder pretreatment due to formation of excessive amounts of solids on reaction with the Group II or IIIA metal alkyl pretreatment component. Preferably, this amount ranges from about 0.001 to about 2 moles of pretreatment modifier per mole of Group II or IIIA metal alkyl component. Best results are attained when the molar ratio of pretreatment modifier to metal alkyl component ranges from about 0.005:1 to about 1:1, and particularly from about 0.01:1 to about 0.5:1. According to one preferred embodiment of the invention wherein the modifier component employed is a mixture of at least one mineral acid or anhydride of sulfur or organometallic chalcogenide derivative and at least one organic acid or ester, it is preferred to employ from about 0.5 to about 20 moles of the organic acid or ester per mole of sulfur-containing modifier. More preferably, this ratio ranges from about 1:1 to about 15:1.

As indicated above, the pretreatment product employed according to this invention is free of unreacted Group II or IIIA metal alkyl and is prepared by contacting the pretreatment components. Although not required, it is preferred to contact the components in the presence of an inert diluent to aid in conductance of heat evolved on reaction of the magnesium alcoholate and metal alkyl components away from the reaction product. In the absence of a diluent, the magnesium alcoholate and metal alkyl components typically react to form a sticky mass which can be difficult to handle in subsequent preparative manipulations. Although it is preferred to contact the pretreatment components in the presence of an inert diluent, other techniques such as pulverization of magnesium alcoholate in the presence of metal alkyl and, optionally, modifier component or a fluidized bed treatment of solid magnesium alcoholate with Group II or IIIA metal alkyl, and optionally, one or more modifiers also can be employed. Most preferably, Group II or IIIA metal alkyl dissolved in an inert diluent is added to a suspension of magnesium alcoholate in a diluent. Modifier components, when used, can be employed in any convenient form.

Diluents suitable for use in pretreatment include hydrocarbons and halogenated derivatives thereof that are substantially inert to the pretreatment components employed and, preferably, are liquid at pretreatment temperatures. It also is contemplated to conduct the pretreatment at elevated pressure so that lower-boiling diluents can be used even at higher temperatures. Examples of useful diluents include alkanes such as hexane, cyclohexane, ethylcyclohexane, heptane, octane, nonane, decane, undecane, and so forth; aromatics such as xylenes and ethylbenzene; and halogenated and hydrogenated aromatics such as chlorobenzene, o-dichlorobenzene, tetrahydronaphthalene, and decahydronaphthalene. Preferred diluents are the alkanes and especially hexane.

The sequence in which the pretreatment components are contacted is not critical. When pretreatment is carried out without the use of pretreatment modifier, the magnesium alcoholate and Group II or IIIA metal alkyl components are simply combined. When one or more modifier components are employed, magnesium alcoholate component, Group II or IIIA metal alkyl component, and modifier component can be contacted concurrently or two of the components can be brought together and then the third component added to the result. Best results are attained when the modifier component is added to a solution of Group II or IIIA metal alkyl component in a diluent and then the resulting solution is added to the magnesium alcoholate component.

Pretreatment according to this invention is carried out at temperature ranging from about $-30°$ to about 130° C. Preferably, the pretreatment temperature ranges from about 0° to about 60° C., with about 10° to about 30° C. being more preferred from the standpoint of convenience. The time of pretreatment generally ranges from several minutes to several hours, with about 1 to about 10 hours being preferred. When pretreatment is conducted in the presence of an inert diluent, it is desirable to agitate the components during pretreatment to ensure thorough contacting of the components.

Following contacting of pretreatment components as described above, unreacted Group II or IIIA metal alkyl component is removed from the reaction product of the pretreatment components to avoid reduction of the titanium component employed in subsequent preparative steps. When pretreatment is conducted in the presence of an inert diluent, the reaction product preferably is separated from the diluent, for example, by filtration or decantation, and unreacted Group II or IIIA metal alkyl is removed therefrom by washing with hexane or another alkane.

The above-described pretreatment is conducted in the substantial absence of water, oxygen, carbon oxides, and other extraneous materials capable of adversely affecting the performance of the invented catalyst components. Such materials are conveniently excluded by carrying out the pretreatment in the presence of an inert gas such as nitrogen or argon, or by other suitable means. Optionally, all or part of the pretreatment may be conducted in the presence of one or more alpha-olefins which, when introduced into the preparative system in gaseous form, can serve to exclude catalyst poisons. The presence of one or more alpha-olefins during pretreatment also can result in improved stereospecificity. Useful alpha-olefins include ethylene, propylene, butene-1, pentene-1, 4-methylpentene-1, hexene-1, and mixtures thereof. Of course, any alpha-olefin employed during pretreatment should be of relatively high purity, for example, polymerization grade or higher. Other precautions which aid in excluding extraneous poisons include purification of any diluent to be employed, such as by percolation through molecular sieves and/or silica gel prior to use, and drying and/or heating of magnesium alcoholate pretreatment components.

As a result of the pretreatment in accordance with this invention, there is obtained a hydrocarbon-insoluble, magnesium-containing pretreatment product which can be reacted with at least one halogen-containing titanium(IV) compound and at least one organic electron donor to form a stereospecific supported catalyst component especially useful in the stereospecific polymerization of alpha-olefins of 3 or more carbon atoms.

Due to the sensitivity of catalyst components to catalyst poisons such as water, oxygen, and carbon oxides, the catalyst components are prepared in the substantial absence of such materials. Catalyst poisons can be excluded by carrying out the preparation under an atmosphere of an inert gas such as nitrogen or argon, or an atmosphere of alpha-olefin as described hereinabove. As noted above, purification of any diluent to be employed also aids in removing poisons from the preparative system.

As a result of the above-described preparation there is obtained a solid reaction product suitable for use as a catalyst component. Prior to such use, it is desirable to remove incompletely-reacted starting materials from the solid reaction product. This is conveniently accomplished by washing the solid, after separation from any preparative diluent, with a suitable solvent, such as a liquid hydrocarbon or chlorocarbon, preferably within a short time after completion of the preparative reaction because prolonged contact between the catalyst component and unreacted starting materials may adversely affect catalyst component performance.

Although not required, the solid reaction product prepared as described herein may be contacted with at least one liquid Lewis acid prior to polymerization. Such Lewis acids useful according to this invention are materials which are liquid at treatment temperatures and have a Lewis acidity high enough to remove impurities such as unreacted starting materials and poorly affixed compounds from the surface of the above-described solid reaction product. Preferred Lewis acids include halides of Group III-V metals which are in the liquid state at temperatures up to about 170° C. Specific examples of such materials include $BCl_3$, $AlBr_3$, $TiCl_4$, $TiBr_4$, $SiCl_4$, $GeCl_4$, $SnCl_4$, $PCl_3$ and $SbCl_5$. Preferable Lewis acids are $TiCl_4$ and $SiCl_4$. Mixtures of Lewis acids can be employed if desired.

Although not required, the above-described solid reaction product may be washed with an inert liquid hydrocarbon or halogenated hydrocarbon before contact with a Lewis acid. Suitable inert liquids include those identified hereinabove as pretreatment and preparative diluents. If such a wash is conducted it is preferred to substantially remove the inert liquid prior to contacting the washed solid with Lewis acid.

The liquid Lewis acid employed according to the invention preferably is used neat although it also is contemplated to employ liquid Lewis acid diluted with up to about 40 vol.% of an inert solvent therefor. Suitable solvents include those materials useful as diluents in preparation of pretreatment product and supported catalyst component as described hereinabove. Of course, any such solvent should be purified prior to use. The amount of Lewis acid used, whether neat or diluted, is not critical. From a pratical standpoint, however, the amount should be great enough to provide a high degree of contact between the solid and liquid, but not so great as to waste the Lewis acid or require excessively large vessels for the contacting. Most preferably, from about 3 to about 10 milliliters of Lewis acid are used for each gram of solid to be treated.

Temperature in the liquid Lewis acid-contacting step is at least high enough to avoid solidification of the Lewis acid employed, but not so high as to adversely affect ultimate catalyst component performance. Preferred temperatures range from about 0° to about 170° C. When $TiCl_4$ is used as the Lewis acid, temperatures of about 20° to about 135° C. are preferred to maintain desirable improvements in catalytic performance while avoiding waste of $TiCl_4$ through vaporization thereof and exposure of catalyst components to conditions more severe than necessary.

The time of contact with liquid Lewis acid is not critical and generally ranges from several minutes to several hours. It is desirable to agitate the solid and Lewis acid during at least a substantial portion of this time to ensure a high degree of contact. Preferred contact times range from 1 to about 30 minutes as the same yield the desired improvements without occupying preparation equipment for undesirably lengthy periods of time.

As in preparation of the solid reaction product, the Lewis acid-contacting step according to this invention is conducted in the substantial absence of oxygen, water, carbon oxides and extraneous catalyst poisons. Such materials are excluded by any convenient manner as described hereinabove.

Following contacting with Lewis acid, solids are allowed to settle and supernatant is removed therefrom such as by filtration or decantation. One or more additional Lewis acid-contacting steps can be carried out with the same or different Lewis acid. In addition, a series of alternating Lewis acid and inert liquid hydrocarbon or halogenated hydrocarbon wastes can be conducted if desired.

Prior to use in the polymerization of alpha-olefins, the catalyst components used in this invention are mechanically activated by comminution. Mechanical activation improves the polymerization performance of the invented catalyst components, whether or not treated with Lewis acid, in terms of both activity and susceptibility to modification by crystallinity-promoting modifiers; however, comminution typically forms a catalyst component which yields increased noncrystalline products. The preferred technique for mechanically activating the invented catalyst components is dry ball-milling, that is, ball-milling in substantial absence of inert diluent. However, good results also can be obtained by ball-milling in the presence of a minor amount of an inert diluent such as hexane or another alkane, as well as by other techniques. The above-described catalyst components can be comminuted in the presence of one or more organic electron donors of the general type employed in preparation of the catalyst components. Techniques of comminution by ball-milling generally are known in the art. Typically, titanium-containing catalyst component and hard, nonreactive balls, such as steel or burundum balls, are placed in a closed container which is agitated, usually by rolling, shaking or rocking. Such comminution is continued for a few hours up to several days, typically about 12 to about 36 hours, until the catalyst component is ground to a desired particle size, typically about 5 to about 50 microns. Since mechanical action of comminution can cause a temperature increase in the comminuting mixture, care should be taken to keep the temperature below the decomposition temperature of the catalyst component. Typically, the comminuting mixture should be kept below about 50° C. Optimum comminution techniques for a specific catalyst component can be determined by routine experimentation.

Optimum polymerization performance is attained by treating with Lewis acid and then mechanically activating. Treatment of mechanically activated catalyst component with Lewis acid alone is not preferred as it may result in agglomeration of the component and inferior polymerization performance.

According to one aspect of this invention, comminuted titanium-containing catalyst components is retreated by contact with a halide-containing titanium-(IV) compound and a chlorocarbon and a mixture of alkyl aromatic esters.

According to another aspect of this invention, comminuted titanium-containing catalyst component is retreated by contact with a halide-containing titanium-(IV) compound and an organochlorosilane and a mixture of alkyl aromatic esters.

According to another aspect of this invention, comminuted titanium-containing catalyst component is retreated by contact with a halide-containing titanium-(IV) compound and a mixture of alkyl aromatic esters.

The constituents of such alkyl aromatic esters have been described above.

Titanium(IV) compounds useful in retreatment are titanium halides and haloalcoholates having 1 to about 20 carbon atoms per alcoholate group such as methoxy, ethoxy, butoxy, hexoxy, phenoxy, decoxy, naphthoxy, dodecoxy and eicosoxy. Mixtures of titanium compounds can be employed if desired.

The titanium(IV) compounds used in this invention can be used in mixtures with corresponding silicon, germanium and tin compounds.

Preferred titanium compounds are the halides and haloalcoholates having 1 to about 8 carbon atoms per alcoholate group. Examples of such compounds include $TiCl_4$, $TiBr_4$, $Ti(OCH_3)Cl_3$, $Ti(OC_2H_5)Cl_3$, $Ti(OC_4H_9)Cl_3$, $Ti(OC_6H_5)Cl_3$, $Ti(OC_6H_{13})Br_3$, $Ti(OC_8H_{17})Cl_3$, $Ti(OCH_3)_2Br_2$, $Ti(OC_2H_5)_2Cl_2$, $Ti(OC_6H_{13})_2Cl_2$, $Ti(OC_8H_{17})_2Br_2$, $Ti(OCH_3)_3Br$, $Ti(OC_2H_5)_3Cl$, $Ti(OC_4H_9)_3Cl$, $Ti(OC_6H_{13})_3Br$, and $Ti(OC_8H_{17})_3Cl$. Titanium tetrahalides and particularly titanium tetrachloride ($TiCl_4$) are preferred from the standpoint of attaining maximum activity and stereospecificity. The most preferred titanium(IV) halide for retreatment is titanium tetrachloride.

Suitable chlorocarbons useful for retreatment contain one to about 12 carbon atoms and from one to about 10 chlorine atoms. Examples of chlorocarbons include chloroform, methylene chloride, 1,2-dichloroethane, 1,1-dichloroethane, 1,1,2-trichloroethane, 1,1,1-trichloroethane, carbon tetrachloride, ethyl chloride, 1,1,2,2-tetrachloroethane, pentachloroethane, hexachloroethane, 1,1-dichloropropane, 1,2-dichloropropane, 1,3-dichloropropane, 2,2-dichloropropane, 1,1,1-trichloropropane, 1,1,2-trichloropropane, 1,1,3-trichloropropane, 1,2,3-trichloropropane, 1,1,1,2-tetrachloropropane, 1,1,2,2-tetrachloropropane, 1,1,1,2,3-pentachloropropane, 1,1,2,3,3-pentachloropropane, 2-methyl-1,2,3-trichloropropane, 1,1-dichlorobutane, 1,4-dichlorobutane, 1,1-dichloro-3-methylbutane, 1,2,3-trichlorobutane, 1,1,3-trichlorobutane, 1,1,1,2-tetrachlorobutane, 1,2,2,3-tetrachlorobutane, 1,1,2,3,4,4-hexachlorobutane, 1,1,2,2,3,4,4-heptachlorobutane, 1,1,2,3,4-pentachlorobutane, 2-methyl-2,3,3-trichlorobutane, 1,2-dichloropentane, 1,5-dichloropentane, 1,1,2,2-tetrachlorohexane, 1,2-dichlorohexane, 1,6-dichlorohexane, 3,4-dichloro-3,4-dimethylhexane and the like. Preferable chlorocarbons used in this invention include carbon tetrachloride, 1,2-dichlorethane, 1,1,2-trichloroethane and pentachloroethane.

Haloalkylchlorosilanes useful in this invention include compounds with the formula

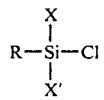

wherein R is a haloalkyl radical containing one to about ten carbon atoms or a halosilyl radical or haloalkylsilyl radical containing one to about eight carbon atoms, and X and X' are halogen, hydrogen, or alkyl or haloalkyl radicals containing one to about ten carbon atoms. Typically, R is a chloroalkyl radical containing one to about eight carbon atoms and one to about twelve chlorine atoms, and X is chlorine or a chloroalkyl radical containing one to four carbon atoms, and X' is a hydrogen or chlorine. Preferable haloalkylchlorosilanes useful in this invention are dichlorosilanes and trichlorosilanes. Also preferable are haloalkylchlorosilanes containing a chloroalkyl group containing one to about four carbon atoms and one to ten chlorine atoms. Preferable haloalkylchlorosilanes include dichloromethyl trichlorosilane, trichloromethyl trichlorosilane, dichloromethyl dichlorosilane, trichloromethyl dichlorosilane, chloromethyl trichlorosilane and hexachlorodisilane. Trichloromethyl trichlorosilane and dichloromethyl trichlorosilane are most preferred.

In retreatment of a comminuted supported titanium-containing catalyst component according to this invention, a retreatment amount of titanium(IV) compound is contacted with the comminuted product. Typically, the atomic ratio of retreatment titanium(IV) to titanium contained in the comminuted catalyst component is about 50:1 to about 500:1 and preferably is about 200:1 to about 250:1. Preferably, retreatment titanium(IV) compound is diluted in a liquid hydrocarbon during retreatment.

In retreatment, mixed aromatic acid esters are contacted with comminuted catalyst component. Typically, the ratio of moles of total retreatment esters to gram-atom of titanium contained in such component is about 0.5:1 to about 10:1 and preferably is about 2:1 to about 4:1. The mixed esters can be diluted in a liquid hydrocarbon before retreatment. Although the titanium(IV) compound and mixed esters can be combined before retreatment, the usual procedure is to contact the comminuted component first with the mixed esters then with the titanium(IV) compound in a diluent.

In retreatment, chlorocarbon and mixed alkyl aromatic acid esters also are contacted with comminuted catalyst component. Typically, the ratio of moles of mixed esters to gram-atom of titanium contained in such component is about 0.5:1 to about 10:1 and preferably is about 1:1 to about 3:1; and the ratio of moles of chlorocarbon to gram-atom of titanium contained in such component is about 20:1 to about 500:1 and preferably is about 50:1 to about 200:1. The chlorocarbon and mixed esters can be diluted in a liquid hydrocarbon before retreatment. Although the titanium(IV) compound and chlorocarbon and mixed esters can be combined before retreatment, the usual procedure is to contact the comminuted component first with the chlorocarbon then with the titanium(IV) compound in a diluent.

In retreatment, haloalkylchlorosilane and mixed alkyl aromatic acid esters also can be contacted with comminuted catalyst component. Typically, the ratio of moles of mixed esters to gram-atom of titanium contained in such component is about 0.5:1 to about 10:1 and preferably is about 1:1 to about 3:1; and the ratio of moles of haloalkylchlorosilane to gram-atom of titanium contained in such component is about 40:1 to about 500:1 and preferably is about 50:1 to about 200:1. The haloalkylchlorosilane and mixed esters can be diluted in a liquid hydrocarbon before retreatment. Although the titanium(IV) compound and haloalkylchlorosilane and mixed esters can be combined before retreatment, the usual procedure is to contact the comminuted component first with the haloalkylchlorosilane then with the titanium(IV) compound in a diluent.

Although the chemical structure of the catalyst components described herein is not presently known, the components preferably contain from about 1 to about 6 wt.% titanium, from about 10 to about 25 wt.% magnesium, less than about 1 wt.% Group IIIA metal and from about 45 to about 65 wt.% halogen. From the standpoint of attaining maximum efficiency of titanium, catalyst components which are more preferred according to this invention contain from about 1.5 to about 3 wt.% titanium, from about 15 to about 20 wt.% magnesium, less than about 0.5 wt.% Group IIIA metal, and from about 50 to about 60 wt.% chlorine.

The catalysts of this invention comprise a stereospecific supported component as described above, and at least one organoaluminum activator. Preferably, the invented catalysts further comprise one or more crystallinity promoters capable of further improving catalyst stereospecificity. Suitable organoaluminum activators include trihydrocarbylaluminum compounds and dihydrocarbylaluminum hydrides having 1 to about 20 carbon atoms per hydrocarbyl radical. Specific examples of useful organoaluminum compounds include $Al(CH_3)_3$, $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$, $Al(C_{12}H_{25})_3$, $Al(CH_3)_2H$, $Al(C_2H_5)_2H$, $Al(C_3H_7)_2H$, $Al(C_4H_9)_2H$, $Al(C_5H_{11})_2H$, $Al(C_6H_{13})_2H$, $Al(C_8H_{17})_2H$, and $Al(C_{12}H_{25})_2H$. Mixtures also can be employed if desired. Preferred organoaluminum compounds are the trialkylaluminums containing 2 to about 6 carbon atoms per alkyl radical as these lead to best results in terms of activity and stereospecificity. Most preferably, the organoaluminum compound is triethylaluminum, triisobutylaluminum or a mixture thereof. The organoaluminum compound is employed in at least an amount which is effective to promote the polymerization activity of the supported component. Preferably the ratio of moles of organoaluminum component to gram-atom of titanium in the supported component is at least about 3:1. More preferably, this ratio ranges from about 5:1 to about 300:1, although substantially greater amounts of organoaluminum component also can be employed and often give highly desirable results.

Useful crystallinity promoters are materials capable of further improving the stereospecificity of the invented catalysts and include a wide variety of materials and combinations of materials. Examples of useful materials include a variety of organic electron donors, such as those employed in preparation of the invented, stereospecific supported catalyst components, and various inorganic mineral acids, anhydrides, and derivatives, including those employed in pretreatment as described hereinabove. The particular materials or combination to be employed can be readily determined by persons skilled in the art and the examples appearing hereinafter illustrate the use of various crystallinity promoters. Preferred materials are those capable of improving stereospecificity without leading to substantial decreases in activity. Examples of preferred crystallinity promoters include methyl-p-toluate, methyl anisate, ethyl benzoate, ethyl-p-anisate, ethyl pivalate, 2,2,6,6-tetramethylpiperidine, 2-benzylpyridine, 2-acetylpyridine, and combinations thereof.

Comminuted catalyst may be prepolymerized with an alpha-olefin before use as a polymerization catalyst component. In prepolymerization comminuted catalyst and an organoaluminum compound co-catalyst such as triethylaluminum are contacted with an alpha-olefin such as propyllene under polymerization conditions, preferably in the presence of a modifier such as methyl-p-toluate and in an inert hydrocarbon such as hexane. Typically, the polymer/catalyst weight ratio of the resulting prepolymerized component is about 0.1:1 to about 20:1. Prepolymerization forms a coat of polymer around catalyst particles which in many instances improves particle morphology, activity and stereospecificity.

The above-described catalysts are useful in polymerization of alpha-olefins such as ethylene and propylene, and are most useful in stereospecific polymerization of alpha-olefins containing 3 or more carbon atoms such as propylene, butene-1, pentene-1, 4-methylpentene-1, and hexene-1, as well as mixtures thereof and mixtures thereof with ethylene. The invented catalysts are particularly effective in the stereospecific polymerization of propylene or mixtures thereof with up to about 20 mole % ethylene or a higher alpha-olefin. Propylene homopolymerization is most preferred. According to the invention, highly crystalline polyalpha-olefins are prepared by contacting at least one alpha-olefin with the above-described catalyst compositions under polymerizing conditions. Such conditions include polymerization temperature and time, monomer pressure, avoidance of contamination of catalyst, choice of polymerization medium in slurry processes, the use of additives to control polymer molecular weights, and other conditions well known to persons of skill in the art. Slurry-, bulk- and vapor-phase polymerization processes are contemplated herein.

The amount of catalyst to be employed varies depending on choice of polymerization technique, reactor size, monomer to be polymerized, and other factors known to persons of skill in the art, and can be determined on the basis of the examples appearing hereinafter.

Irrespective of the polymerization process employed, polymerization should be carried out at temperatures sufficiently high to ensure reasonable polymerization rates and avoid unduly long reactor residence times, but not so high as to result in the production of unreasonably high levels of stereorandom products due to excessively rapid polymerization rates. Generally, temperatures range from about 0° to about 120° C. with about 20° to about 95° C. being preferred from the standpoint of attaining good catalyst performance and high production rates. More preferably, polymerization according to this invention is carried out at temperatures ranging from about 50° to about 80° C.

Alpha-olefin polymerization according to this invention is carried out at monomer pressures of about atmospheric or above. Generally, monomer pressures range from about 20 to about 600 psi, although in vapor phase polymerizations, monomer pressures should not exceed the vapor pressure at the polymerization temperature of the alpha-olefin to be polymerized.

The polymerization time is not critical and will generally range from about ½ to several hours in batch processes. Polymerization times ranging from about 1 to about 4 hours are typical in autoclave-type reactions. In slurry processes, the polymerization time can be regulated as desired. Polymerization times ranging from about ½ to several hours are generally sufficient in continuous slurry processes.

Diluents suitable for use in slurry polymerization processes include alkanes and cycloalkanes such as pentane, hexane, heptane, n-octane, isooctane, cyclohexane, and methylcyclohexane; alkylaromatics such as toluene, xylene, ethylbenzene, isopropylbenzene, ethyl toluene, n-propyl-benzene, diethylbenzene, and mono- and dialkylnaphthalenes; halogenated and hydrogenated aromatics such as chlorobenzene, chloronaphthalene, ortho-dichlorobenzene, tetrahydronaphthalene, decahydronaphthalene; high molecular weight liquid paraffins or mixtures thereof, and other well-known diluents. It often is desirable to purify the polymerization medium prior to use, such as by distillation, percolation through molecular sieves, contacting with a compound such as an alkylaluminum compound capable of removing trace impurities, or by other suitable means. Examples of gas-phase polymerization processes in which the catalyst of this invention is useful are described in U.S. Pat. Nos. 3,957,448; 3,965,083; 3,971,768; 3,972,611; 4,129,701; 4,101,289; 3,652,527 and 4,003,712.

Irrespective of polymerization technique, polymerization is carried out under conditions that exclude oxygen, water, and other materials that act as catalyst poisons. Typically, no special precautions need be taken to exclude such materials because a positive pressure of monomer gas commonly exists within the reactor.

Also, according to this invention, polymerization can be carried out in the presence of additives to control polymer molecular weights. Hydrogen is typically employed for this purpose in a manner well known to persons of skill in the art.

Upon completion of polymerization, or when it is desired to terminate polymerization or deactivate the catalysts of this invention, the catalyst can be contacted with water, alcohols, acetone, or other suitable catalyst deactivators in a manner known to persons of skill in the art.

The products produced in accordance with the process of this invention are normally solid, predominantly isotactic polyalpha-olefins. Polymer yields are sufficiently high relative to the amount of catalyst employed so that useful products can be obtained without separation of catalyst residues. Further, levels of stereorandom by-products are sufficiently low so that useful products can be obtained without separation thereof. The polymeric products produced in the presence of the invented catalysts can be fabricated into useful articles by extrusion, injection molding, and other common techniques.

The following examples illustrate but do not limit the described invention.

EXAMPLES I-II

Step A: Preparation of Pretreated Magnesium-containing Component

Into a one-liter flask equipped with magnetic stirrer and maintained under nitrogen in a drybox were added 200 milliliters of dry n-hexane and 25.0 grams of anhydrous magnesium ethoxide (obtained from Dynamit Nobel) at ambient temperature. The resulting suspension was stirred and 25 milliliters of a mixture of a 25 wt.% solution of triethylaluminum (TEA) in dry n-hexane was added. Stirring was continued for one hour following completion of the addition of TEA solution and then the solid reaction product was allowed to settle. The supernatant then was decanted and the solid was washed eight times with 100-milliliter portions of dry n-hexane and then dried under a stream of nitrogen gas for about 20 minutes.

Step B: Preparation of Supported Catalyst Component

The solid from Step A was resuspended in a one-liter resin kettle equipped with an overhead stirrer in 50 milliliters of carbon tetrachloride, 50 milliliters of 1,2-dichloroethane and 100 milliliters of titanium tetrachloride at ambient temperature. To the resulting mixture an alkyl aromatic acid ester was added dropwise over a period of about 3 minutes at ambient temperature with stirring at 500 rpm. After addition of the ester was completed, the resulting mixture was heated to 90° to 95° C., stirred at this temperature for 1.75 hours, and then allowed to cool. The supernatant then was decanted, about 150 milliliters of dry n-hexane were added, and the solid was separated from the liquid by filtration and dried.

Step C: Comminution of Supported Catalyst Component

The solid catalyst component prepared in Step B and 70 stainless steel balls having a diameter of 10 millimeters were placed in a Roalox, burundum-fortified porcelain mill jar (manufactured by A. Daigger Company) having a capacity of ¼ quart (about 280 milliliters) and milled in a rotary ball mill (manufactured by Paul O. Abbe, Inc., motor speed=1725 rpm) for 16 hours at ambient temperature under an atmosphere of dry nitrogen. The solid was sieved to remove all particles which could not pass through a 200 mesh (U.S. Sieve Series) sieve.

Step D: Retreatment of Comminuted Catalyst Component

The solid obtained from Step C was mixed with equal portions of 1,2-dichloroethane and of carbon tetrachloride (each at 2-3 ml/gram of solid) and an excess of titanium tetrachloride (6-7 ml/gram of solid) was added. After ester was added dropwise to this mixture with stirring at 400-500 rpm, the resulting suspension was heated to 95°-100° C. for 1.5 hours while stirring. After cooling to 80° C., the solid product was allowed to settle, supernatant liquid was removed by decantation and the residue washed five times with 150-milliliter portions of n-hexane. The remaining solid was filtered and dried. Table I summarizes the particular esters used in preparations of individual catalysts in Examples I and II and Comparative Runs A-E.

Propylene Polymerization

A series of bulk propylene polymerizations were conducted using aliquots of titanium-containing catalyst components prepared above. Portions of triethylaluminum (TEA), either diethylaluminum chloride or a TEA-tetramethylpiperidine complex, para-substituted alkyl aromatic acid ester and 0.01 gram of titanium-containing catalyst component were combined in a drybox under nitrogen and flushed into a two-liter Parr reactor in 300 milliliters of propylene. After an additional 1000 milliliters of propylene and 10 psig of hydrogen were charged to the reactor, the reactor was closed and polymerization conducted at 71° C. for two hours. After the reactor was cooled and vented, the resulting solid polymer was air dried overnight and then weighed. The amount of "Extractables" was determined by measuring the loss in weight of a dry sample of ground polymer after being extracted in boiling n-hexane for six hours. Results are shown in Table II.

TABLE I

| Example (Run) | Step B Ester (ml) | Solid Used in Step D (grams) | Step D Ester (ml) | Catalyst Composition Mg/Ti/Ester (molar ratio) |
|---|---|---|---|---|
| A | EB(6.3) | 12.1 | EB(2.2) | 1.00/0.090/0.193(EB) |
| B | EB(6.3) | 16.0 | EA(4.9) | 1.00/0.082/0.073(EB) 0.114(EA) |
| C | EB(13.8) | 17.1 | EA(6.3) | 1.00/0.080/0.198(EA) |
| D (1) | EB(6.3) | 8.3 | EB(1.4) | 1.00/0.092/0.169(EB) |
| I (1) | EB(6.3) | 8.3 | EB(0.7) EA(0.8) | 1.00/0.090/0.122(EB) 0.044(EA) |
| E (2) | EB(6.3) | 11.9 | EB(2.0) | 1.00/0.093/0.195(EB) |
| II (2) | EB(6.3) | 11.9 | EB(1.0) MB(0.9) | 1.00/0.098/0.146(EB) 0.045(MB) |

(1) Same preparation through Step C
(2) Same preparation through Step C
EA = Ethyl p-anisate
EB = Ethyl Benzoate
MB = Methyl p-tert-Butyl Benzoate

TABLE II

| Example (Run) | Cocatalyst (2) | Yield (grams/gram of catalyst) | Hexane Extractables (wt. %) | Bulk Density (lbs/ft³) |
|---|---|---|---|---|
| F (1) | X | 34,313 | 3.5 | 26.2 |
|  | Y | 22,267 | 3.7 | 26.2 |
| B | X | 28,614 | 3.0 | 27.1 |
|  | Y | 13,800 | 2.8 | 26.1 |
| C | X | 14,887 | 5.4 | 23.9 |
|  | Y | 11,712 | 5.6 | 24.6 |
| I | X | 37,312 | 3.9 | 26.4 |
|  | Y | 26,522 | 3.8 | 26.1 |
| II | X | 33,858 | 3.5 | 27.2 |
|  | Y | 25,898 | 3.6 | 27.4 |

(1) Average of catalysts prepared in Runs A, D and E
(2) Cocatalyst systems (Molar Ratios):
X = TEA/TEA.TMPiP/EA (1.4/10.6/1.0)
Y = TEA/DEAC/Mpt (4.0/0.5/1.0)
TEA = Triethylaluminum
DEAC = Diethylaluminum chloride
TMPiP = 2,2',6,6'-tetramethylpiperidine
TEA.TMPiP = 1:1 complex of TEA and TMPiP
Mpt = Methyl-p-toluate

EXAMPLE III-COMPARATIVE RUN G

Two more catalysts were prepared in a manner similar to that described in Examples I and II with the exception that in Step A the amount of magnesium ethoxide, triethyl aluminum and hexane were doubled; in Step B the amounts of all reactants were doubled and the ester was added at ambient temperature; in Step C the solid from Step B was divided into two equal portions and milled for 20 hours using 80 stainless steel balls in each mill. Further details concerning these preparations are shown in Table III.

The catalysts were tested in slurry polymerization conditions. One aspect of the polymerization tests was to determine catalyst activity over time, i.e., the catalyst "shelf life." Table IV summarizes the slurry polymerization tests. All results are averages of duplicate runs. Slurry polymerizations were conducted in 780 milliliters of n-hexane contained in a 2-liter autoclave equipped with a mechanical stirrer. Polymerization was continued for two hours at 160° F. at 250 psig using 20 milligrams of catalyst, after which time, solid polypropylene was removed from the reactor, filtered, dried and weighed. Hexane "Solubles" were determined by evaporation of the filtrate to dryness and weighing the residue. Extractables were determined as described in Examples I-II. The data show the catalyst of this invention maintained its high activity over time.

TABLE III

| Example (Run) | Step B Ester (ml) | Solid Used in Step D (grams) | Step D Ester (ml) | Catalyst Composition Mg/Ti/Ester |
|---|---|---|---|---|
| G | EB(12.6) | 53.35 | EB(8.2) | 1.00/0.104/0.237(EB) |
| III | EB(12.6) | 53.33 | EB(5.2) EA(3.0) | 1.00/0.108/0.175(EB) 0.029(EA) |

TABLE IV

| Example (Run) | Cocatalyst System (1) | (2) Time (days) | Yield (grams/gram of catalyst) | Hexane Solubles (wt. %) | Hexane Extractables (wt. %) |
|---|---|---|---|---|---|
| G | i | 0 | 9,550 | 2.2 | 0.8 |
| G | i | 51 | 9,700 | 2.9 | 1.1 |
| G | ii | 0 | 11,400 | 3.4 | 1.3 |
| G | ii | 50 | 9,300 | 3.2 | 1.3 |
| III | iii | 0 | 11,900 | 2.9 | 1.6 |

TABLE IV-continued

| Example (Run) | Cocatalyst System (1) | (2) Time (days) | Yield (grams/ gram of catalyst) | Hexane Solubles (wt. %) | Hexane Extractables (wt. %) |
|---|---|---|---|---|---|
| III | iii | 26 | 11,450 | 3.9 | 1.9 |

(1) Cocatalyst system (molar ratio)
i = TEA/TIBA/MpT (1.75/1.75/1.0)
ii = TEA/TIBA/MpT (2.0/2.0/1.0)
iii = TEA/TIBA/MpT (2.67/1.33/1.0)
TEA = Triethyl aluminum
TIBA = Triisobutyl aluminum
MpT = Methyl p-toluate
(2) Time elapsed between catalyst preparation and polymerization test.

COMPARATIVE RUNS H-L

A series of catalysts were prepared for comparative purposes in which different esters were substituted in Step B as described in Example I. Propylene was polymerized under bulk conditions as described in Example I in a 2-liter Parr reactor maintained for two hours at 160° F. and 485 psig with 1300 milliliters of propylene, 45.5 millimoles of hydrogen. Ten milligrams of titanium-containing catalyst were used with a co-catalyst system comprising triethylaluminum/diethylaluminum chloride/methyl-p-toluate in a molar ratio of 4.0/0.5/1.0. The results shown in Table V show that substituting an alkyl aromatic acid ester with an electron-withdrawing substituent, alone or mixed with ethyl benzoate, is not an improvement over using ethyl benzoate alone in Step B.

TABLE V

| Run | Ester Used in Step B | Ester Used in Step D | Yield (grams/ gram of catalyst) | Extractables (wt. %) |
|---|---|---|---|---|
| H | EB | EB | 22,267 | 3.7 |
| J | pBrEB | EB | 13,880 | 5.5 |
| K | pClMB | EB | 19,283 | 4.4 |
| L | pClMB/EB (50/50) | EB | 22,508 | 3.9 |

EB = Ethyl benzoate
pBrEB = Ethyl-p-bromobenzoate
pClMB = Methyl-p-chlorobenzoate

EXAMPLES IV-VIII COMPARATIVE RUNS M-P

A series of titanium-containing catalyst components was prepared in a manner similar to that described in Example I. Ethyl benzoate was used as the sole ester in Step B while the ester composition was varied in Step D. Polymerization tests were conducted as described in Comparative Examples H-L. The results presented in Table VI show mixtures of esters used in retreatment Step D (Examples I, II, IV-VI) are superior to the Comparative Runs in maintaining both high yield and low extractables.

TABLE VI

| Example (Run) | Step D Ester (Molar Ratio) | | Catalyst Composition (wt. %) | | Yield (grams/ gram of TiCl₃) | Extractables (wt. %) |
|---|---|---|---|---|---|---|
|  | EB | MtBB | EB | MtBB |  |  |
| M (1) | 100 | 0 | 17.5 | 0 | 22,267 | 3.7 |
| IV (2) | 60 | 40 | 12.8 | 5.1 | 25,898 | 3.6 |
| V | 50 | 50 | 10.9 | 4.1 | 17,563 | 3.9 |
| N | 0 | 100 | 7.1 | 9.2 | 15,730 | 4.7 |
|  | EB | EA | EB | EA |  |  |
| M (1) | 100 | 0 | 17.5 | 0 | 22,267 | 3.7 |
| VI | 67 | 33 | 14.4 | 2.9 | 12,090 | 1.8 |

TABLE VI-continued

| Example (Run) | Step D Ester (Molar Ratio) | Catalyst Composition (wt. %) | | Yield (grams/ gram of TiCl₃) | Extractables (wt. %) |
|---|---|---|---|---|---|
| VII | 60 | 40 | 12.0 | 3.1 | 24,807 | 3.5 |
| VIII (3) | 50 | 50 | 11.5 | 5.0 | 26,522 | 3.8 |
| P (4) | 0 | 100 | 6.8 | 12.7 | 18,800 | 2.8 |

EB = Ethyl benzoate
EA = Ethyl anisate
MtBB = Methyl-p-tert-butyl benzoate
(1) Average of catalysts prepared in Runs A, D and E.
(2) Same as Example II.
(3) Same as Example I.
(4) Same as Run B

EXAMPLES IX-X COMPARATIVE RUNS Q-R

In order to demonstrate the superiority of catalysts prepared according to this invention in "hot" start conditions a series of catalysts were prepared with and without using the techniques described in this invention. These catalysts were tested under "hot" start and cool start conditions. Although both hot and cool start polymerizations were conducted nominally at 165° F., the procedure for starting the reaction made considerable difference in the result. Under cool start conditions, a mixture of titanium-containing catalyst component and triethyl aluminum in hexane was added to 1000 milliliters of hexane at 115° F. in a 2-liter Parr reactor. The reactor was closed and the mixture heated. 270 milliliters of hydrogen was added and the reactor pressurized to 150 psig with propylene. Operating temperature and pressure of 165° F. at 250 psig was reacted in 5 to 10 minutes.

Under "hot" start conditions, triethyl aluminum, hydrogen and propylene were injected to 1000 milliliters of hexane maintained at 160° F. The pressure was maintained at 200 psig. Titanium-containing catalyst component then was injected with a hexane flush. In both cases polymerization was maintained for two hours, after which time solid polypropylene was removed from the reactor, filtered, dried and weighed. Hexane "Solubles" were determined by evaporation of the filtrate to dryness and weighing the residue. Extractables were determined as described in Examples I-II. Results are shown in Table VII. The results show that catalysts prepared according to this invention are superior under hot start conditions.

TABLE VII

| Example (Run) | Retreatment Ester (molar ratio) | Mode | Yield (gram/ gram of TiCl₃) | Hexane Soluble (wt. %) | Extractables (wt. %) | Soluble & Extractables (wt. %) | Total Solubles (wt. %) |
|---|---|---|---|---|---|---|---|
| Q | EB only | Cool | 10,300 | 3.2 | 1.1 | | 4.3 |
|   |         | Hot  | 6,900  | 4.6 | 0.7 | | 5.3 |
| IX | EB/EA (67/33) | Cool | 9,200 | 3.1 | 0.6 | | 3.7 |
|    |                | Hot  | 8,700 | 3.3 | 0.8 | | 4.1 |
| R | EB only | Cool | 10,320 | 4.1 | 1.3 | | 5.4 |
|   |         | Hot  | 7,400  | 5.8 | 0.8 | | 6.6 |
| X | EB/MtBB (60/40) | Cool | 10,680 | 3.2 | 1.6 | | 4.8 |
|   |                  | Hot  | 9,590  | 4.6 | 1.0 | | 5.6 |

EB = Ethyl benzoate
EA = Ethyl anisate
MtBB = Methyl-p-tert-butyl benzoate

What is claimed is:

1. A polymerization catalyst for alpha-olefins comprising (A) an organoaluminum compound and (B) a solid, titanium-containing component formed by:

1. comminuting a solid reaction product comprising:
   (a) at least one halogen-containing compound of titanium(IV);
   (b) at least one electron donor containing at least one atom of oxygen, nitrogen, sulfur, or phosphorus; and
   (c) at least one hydrocarbon-insoluble, magnesium-containing compound; and
2. retreating such comminuted product with
   (a) at least one halogen-containing compound of titanium(IV);
   (b) a mixture containing about 30 to about 70 mole percent ethyl benzoate and about 70 to about 30 mole percent of at least one para-substituted alkyl carboxylic aromatic acid ester in which the substituent group has a negative Hammett constant; and
   (c) optionally, a chlorocarbon or a haloalkylchlorosilane.

2. The catalyst of claim 1 wherein component (1)(a) is titanium tetrachloride and retreatment component (2)(a) is titanium tetrachloride.

3. The catalyst of claim 2 wherein the electron donor component (1)(b) is selected from the group consisting of ethyl benzoate, ethyl anisate or methyl-p-toluate.

4. The catalyst of claim 2 wherein the substituted alkyl aromatic acid ester is ethyl anisate, methyl anisate, propyl anisate, or methyl-t-butyl benzoate.

5. The catalyst of claim 1 wherein the magnesium-containing compound (1)(c) is a pretreatment product of components comprising (i) at least one magnesium alcoholate; and (ii) at least one Group II or Group IIIA metal alkyl.

6. The catalyst of claim 1 wherein the magnesium-containing component (1)(c) is (i) a magnesium halide or (ii) a reaction product of a magnesium halide with organic carboxylic acid esters or alcohols or with an organometallic compound of Groups I-III metals.

7. The catalyst of claim 1 wherein the molar ratio of electron donor (1)(b) to titanium(IV) compound (1)(a) is about 0.001:1 to about 1:1 and the atomic ratio of titanium in (1)(a) to magnesium in (1)(c) is at least about 0.5:1.

8. The catalyst of claim 1 wherein the organoaluminum compound (A) comprises triethylaluminum.

9. A propylene polymerization catalyst comprising (A) triethylaluminum, triisobutylaluminum or mixture thereof and (B) a solid, titanium-containing component formed by:
   (1) ball-milling the solid reaction product comprising:
     (a) titanium tetrachloride
     (b) ethyl benzoate
     (c) a hydrocarbon-insoluble, magnesium-containing pretreatment product comprising:
       (i) magnesium ethoxide;
       (ii) triethylaluminum; and
   (2) retreating such ball-milled product with
     (a) titanium tetrachloride; and
     (b) a mixture containing about 30 to about 70 mole percent ethyl benzoate and about 70 to about 30 mole percent of at least one para-substituted alkyl carboxylic aromatic acid ester in which the substituent group has a negative Hammett constant.

10. A process for preparing a catalyst component useful in polymerization of alpha-olefins comprising:
    (A) contacting components comprising (1) at least one magnesium alcoholate, and (2) at least one Group II or IIIA metal alkyl in amounts such that the atomic ratio of metal in (2) to metal in (1) ranges from about 0.001:1 to about 1:1;
    (B) removing unreacted Group II or IIIA metal component from the product of (A) to form a solid, hydrocarbon-insoluble, magnesium-containing pretreatment product;
    (C) contacting said pretreatment product with components comprising at least one titanium(IV) halide or haloalcoholate and at least one organic electron donor containing at least one of oxygen, nitrogen, sulfur or phosphorus, in amounts such that the atomic ratio of titanium to metal in (A)(1) is at least about 0.5:1 and the ratio of organic electron donor to titanium ranges from about 0.001 to about 1 mole per gram-atom, to form a solid catalyst component;
    (D) comminuting the resulting product; and
    (E) retreating the comminuted product by contacting such product with components comprising at least one titanium(IV) halide or haloalcoholate and a mixture containing about 30 to about 70 mole percent ethyl benzoate and about 70 to about 30 mole percent of at least one para-substituted alkyl carboxylic aromatic acid ester in which the substituent group has a negative Hammett constant in amounts such that the atomic ratio of retreatment titanium to titanium contained in the comminuted product is about 50:1 to about 500:1 and the ratio of moles of organic acid ester to gram-atom of titanium contained in the comminuted product is about 0.5:1 to about 10:1.

11. The process of claim 10 wherein retreatment titanium compound is titanium tetrachloride.

12. The process of claim 11 wherein the electron donor in (C) is selected from the group consisting of ethyl benzoate, ethyl anisate and methyl-p-toluate.

13. The process of claim 11 wherein the molar ratio of ethyl benzoate to para-substituted alkyl aromatic ester is about 70/30 to about 50/50.

14. The process of claim 11 wherein the substituted alkyl aromatic acid ester is ethyl anisate, methyl anisate, propyl anisate, or methyl-t-butyl benzoate.

15. The catalyst of claim 1 wherein the comminuted product also is retreated with a chlorocarbon containing one to about 12 carbon atoms and from one to about 10 chlorine atoms.

16. The catalyst of claim 15 wherein the chlorocarbon is carbon tetrachloride, 1,1,2-trichloroethane, 1,2-dichloroethane or pentachloroethane.

17. The catalyst of claim 1 wherein the comminuted product also is retreated with a haloalkylchlorosilane having a formula $$R-\underset{\underset{X'}{|}}{\overset{\overset{X}{|}}{Si}}-Cl$$

wherein R is a haloalkyl radical containing one to about ten carbon atoms or a halosilyl radical or haloalkylsilyl radical containing one to about eight carbon atoms, and X and X' are halogen, hydrogen, or alkyl or haloalkyl radicals containing one to about ten carbon atoms.

18. The process of claim 10 wherein retreatment haloalkylchlorosilane is dichloromethyl trichlorosilane or trichloromethyl trichlorosilane.

19. The process of claim 10 wherein the molar ratio of ethyl benzoate to para-substituted alkyl aromatic ester is about 70/30 to about 50/50.

20. The process of claim 10 wherein the molar ratio of ethyl benzoate to para-substituted alkyl aromatic ester is about 60/40.

* * * * *